Dec. 1, 1964     W. KIRCHNER ETAL     3,158,942

LENGTH MEASURING DEVICE, PARTICULARLY FOR INTERNAL DIAMETERS

Filed Aug. 16, 1962     2 Sheets-Sheet 1

Inventors
Willi Kirchner
Gerhard Braune
By Stevens, Davis, Miller & Mosher
Attorneys Dec. 1, 1964    W. KIRCHNER ETAL    3,158,942
LENGTH MEASURING DEVICE, PARTICULARLY FOR INTERNAL DIAMETERS
Filed Aug. 16, 1962    2 Sheets-Sheet 2

INVENTORS
Willi Kirchner,
Gerhard Braune

BY
Stevens, Davis, Miller & Mosher
ATTORNEYS

United States Patent Office 3,158,942
Patented Dec. 1, 1964

3,158,942
LENGTH MEASURING DEVICE, PARTICULARLY FOR INTERNAL DIAMETERS
Willi Kirchner, Schwebheim, and Gerhard Braune, Schweinfurt, Germany, assignors to Kugelfischer Georg Schafer & Co., Schweinfurt, Germany
Filed Aug. 16, 1962, Ser. No. 217,400
Claims priority, application Germany Aug. 29, 1961
10 Claims. (Cl. 33—174)

The constantly increasing requirements regarding the accuracy and the closeness of tolerances within which workpieces have to be held call for a corresponding increase in the accuracy of production and measuring methods. For example, the internal and external diameters of antifriction bearings have to be held within tolerances of a few microns, it being necessary to adhere to such close tolerances also in mass production operations. For such precision measurements use is made of high-accuracy feeler gauges providing a high magnification by mechanical, electronic or pneumatic means. Such gauges, when used in conjunction with measuring pedestals and the like in the case of external measurements, and in conjunction with bore hole measuring instruments in the case of internal measurements, permit deviations of the dimensions of a workpiece from the desired dimensions to be measured with an accuracy of a fraction of a micron.

For the purpose of setting up the measuring pedestals or the bore hole measuring instruments, use is made of so-called master discs or master rings which serve as standards. These standards must meet particularly severe accuracy requirements, the desired accuracy being plus or minus 0.05 micron. The accurate measuring of master rings presents a particularly difficult problem. The heretofore known length measuring machines operating on the basis of mechanical contact or without mechanical contact and using standard scales made of glass or steel afford an accuracy of up to one micron and are, therefore, unable to meet the aforementioned accuracy requirements.

According to the present invention, these drawbacks are eliminated by the provision of a device adapted to measure lengths, particularly the length of internal diameters, operating on Abbe's principle and using gauge blocks (slip gauges) as standards of comparison; the device of the invention includes a base, an adjustable measuring table and a measuring spindle, the gauge blocks serving as standards of comparison being applied to the rear end of the measuring spindle, the said gauge blocks and a workpiece to be compared therewith being brought in contact with feeler systems of identical construction, the feeler system engaging the gauge blocks being disposed on said base, the feeler system engaging the workpiece being arranged on the forward end of the measuring spindle, and a precision feeler system provided on the base serving to indicate the deviation of the workpiece from the standard of comparison.

Other objects and features of the invention will become apparent as the description proceeds, especially when taken in conjunction with the accompanying drawings, illustrating preferred embodiments of the invention, wherein.

Figure 1:
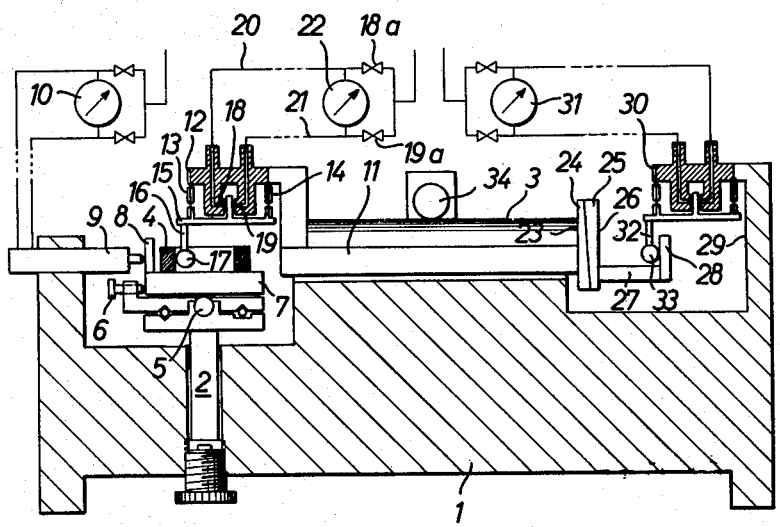
FIG. 1 is a diagrammatic side-elevational part-sectional representation of an embodiment of the device of the invention.

As will be seen from an inspection of FIG. 1, there is provided in a base 1 a vertically slidably mounted measuring table 2 and a horizontal measuring spindle 3 which is held against rotation and which is movable in the direction in which the length to be measured extends. The measuring table 2 serves as a support for the workpiece 4 to be measured and is adapted to be displaced transversely of the direction of measuring by means of a screw 5 and in the direction of measuring by means of a screw 6. The upper plate 7 of measuring table 2 carries a rigidly secured measuring anvil or stop member 8 which is engaged by the feeler element of a precision feeler gauge 9 clamped in position in base 1 and preferably operating pneumatically, it being understood, however, that the feeler gauge 9 may be of any other suitable construction. The measurements taken by feeler gauge 9 are indicated by a pressure gauge 10. The forwarded end 11 of the measuring spindle 3 has rigidly attached thereto a feeler system 12 comprising a feeler arm 16 carried by a movable member 15 which is in turn supported by a pair of leaf springs 13, 14, the lower end of feeler arm carrying a feeler element in the form of a sphere 17. The feeler system 12 also is preferably of the pneumatically operating type. Any displacement of the movable member 15 in the direction of measuring will produce changes in the effective cross-section of two nozzles 18 and 19, this causing changes in pressure to be produced in a per se known manner in the lines 20 and 21 of a pneumatic circuit, said changes in pressure being indicated by a pressure gauge 22, preferably in the form of a U-shaped tube filled with a liquid. It is convenient to select the nozzles 18, 19, the inlet nozzles 18a, 19a and the pressure in the pneumatic circuit in such a manner that the air under pressure discharged by the nozzles 18 and 19 will produce the required slight measuring force exerted between the sphere 17 and the workpiece 4 and will also stabilize the movable member 15 of the feeler system 12 in its zero position when there is no contact. The use of this method provides for measuring forces of between 1 and 3 grams, it being possible to dispense with the use of springs serving to produce a measuring force mechanically.

Provided on the rearward end 23 of the measuring spindle or rod 3 are two slightly tapered plates 24 and 25 which are arranged for relative rotation so as to permit the face 26 of plate 25 to be adjusted to extend at right angles to the direction of motion of measuring rod 3. The surface 26 serves to attach a gauge block 27 which in turn supports a terminal gauge block 28. Thus, the gauge block 27, the surface 26 and the terminal gauge block 28 constitute the standard of comparison with which the workpiece 4 is to be compared. Carried by the rear end portion 29 of base 1 is a feeler system 30 which is movable in the direction of measuring and which is of identical construction to the feeler system 12. The changes in pressure occurring during a measuring operation will be indicated by a pressure gauge 31. The feeler arm 32 extends into the standard of comparison constituted by the surface 26, the gauge block 27 and the terminal gauge block 28 and contacts the same in the axis of measurement by means of a sphere 33. The two spheres 17 and 33 are of exactly the same diameter. Also the magnification ratio of the two pneumatic measuring circuits is the same. For the purpose of displacing the measuring rod 3 there is provided a friction drive diagrammatically indicated by a friction wheel 34 in FIG. 1.

Figure 2:
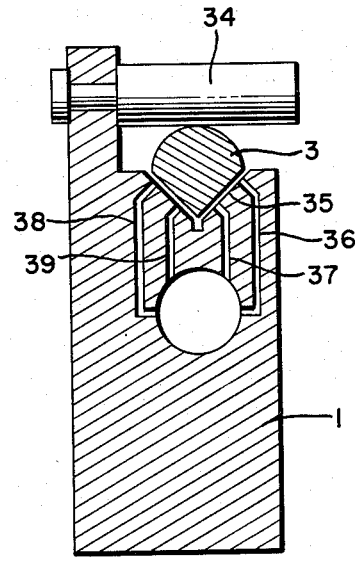
FIG. 2 is a transverse cross-section of the base and the measuring spindle of the inventive device.
Figure 4:
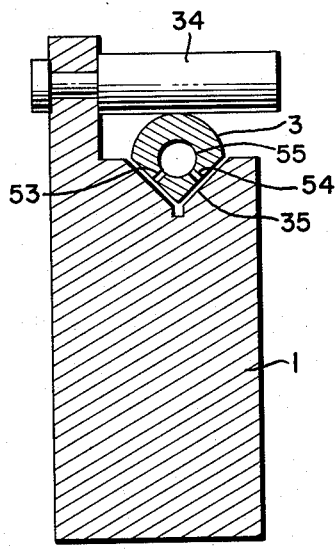
FIG. 4 is a transverse cross-sectional view of the base and the measuring spindle in another embodiment of the invention.

As will be seen from FIG. 2, the measuring rod 3 may be supported by air under pressure. The embodiment shown includes an air bearing of V-shaped cross-section. Provided in the guideway 35 of base 1 are numerous small-diameter ducts 36, 37, 38, 39 which are uniformly supplied with air under pressure. This arrangement provides for the measuring rod 3 to be guided by means which are not subject to wear. In the embodiment shown in FIGURE 4 the air discharge ducts 53, 54 are provided in the measuring rod 3. The ducts 53 and 54 are uniformly supplied with compressed air by way of the bore 55 within the rod 3.

Figure 3:
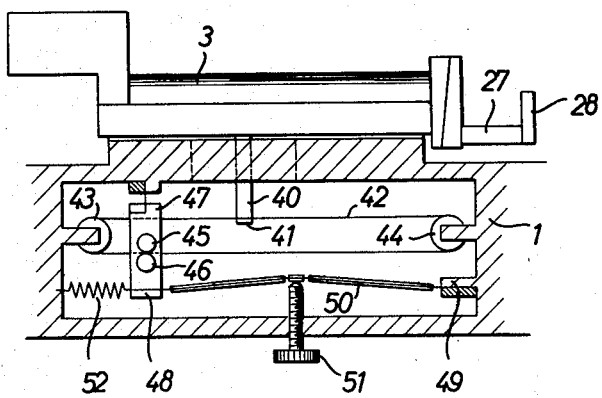
FIG. 3 is a diagrammatic showing of a fine adjustment device for the measuring spindle.

FIG. 3 illustrates a friction drive system which includes a fine adjustment mechanism. The measuring rod 3 carries a depending projection 40 whose lower end 41 is fixedly connected to an endless belt 42 trained about two rolls 43 and 44 supported for rotation in base 1. The belt 42 is adapted to be frictionally driven by a friction wheel or capstan 45 co-operating with a pressure wheel or roll 46. The capstan 45 and the pressure roll 46 are frictionally carried by an arm 47 supported within base 1 and adapted to be pivoted in the direction of measuring. Extending between the lower end of arm 47 and an internally projecting lug 49 of base 1 is a leaf spring 50 which extends parallel to the axis of measuring rod 3. An adjusting screw 51 engaging a threaded hole in base 1 engages the leaf spring 50 transversely of the direction of motion of measuring rod 3. The leaf spring 50 is subjected to a pulling force by a tension spring 52 anchored to the lower end 48 of arm 47 and a portion of base 1, respectively. Coarse adjustment of the measuring rod 3 is effected by means of friction wheel or capstan 45, fine adjustment being possible with the aid of adjusting screw 51.

The operation of the device of the invention in measuring a workpiece is as follows:

The gauge block 27 is adhered to the surface 26 of plate 25 and is in turn fitted with the terminal gauge block 28. This operation provides the standard of comparison. The workpiece to be measured, for example a master ring, is then placed on the measuring table 2. The feeler balls 17 and 33 are not yet engaged. The two pressure gauges 22 and 31 are in their respective zero positions. Now the measuring rod 3 is displaced towards the left in FIG. 1 until the ball 33 comes in contact with the terminal gauge block 28, the ball being deflected from its zero position by a small amount of, for example, 2 microns, this deflection being indicated by pressure gauge 31. Following this, screw 5 is manipulated to adjust the workpiece 4 in relation to the direction of measuring; then the workpiece is displaced towards the right with the aid of screw 6 until the ball 17 comes in contact with the workpiece and is deflected by the same amount of for example 2 microns as the ball 33 has been deflected from its zero position. This deflection is read from pressure gauge 22. Thus, the feeler systems 12 and 30 have been aligned with the respective surfaces of the standard of comparison 26, 27, 28 and the workpiece 4. Now the precision feeler gauge 9 is moved into contact with anvil 8 and is zeroed. The respective value is indicated by pressure gauge 10. Subsequently, the measuring rod 3 is moved towards the right until ball 33 contacts the surface 26 and is deflected by the same small amount of, for example, 2 microns from its zero position, but in the opposite direction. Then the screw 6 is manipulated to displace the workpiece 4 sufficiently in the direction of measuring to deflect ball 17 by the same amount from its zero position by which the ball 33 has been deflected. The respective values are indicated by the two pressure gauges 22 and 31. This operation terminates the measuring operation, the deviation of the workpiece 4 from the standard of comparison 26, 27, 28 being indicated by pressure gauge 10.

In view of the fact that present-day gauge blocks are made to a tolerance of 0.02 micron and that pneumatic feeler systems of extremely high magnification of, for example, 40,000 are available, the measuring forces being extremely small, e.g. between 1 and 3 grams, it is possible, with the aid of the measuring device of the invention, to obtain a measuring accuracy of plus or minus 0.05 micron.

What is claimed is:

1. A length measuring device, particularly for internal diameters and operating on Abbe's principle, comprising gauge blocks utilized as a standard of comparison, a base, a measuring table for receiving a workpiece to be measured, a measuring rod having a rearward and a forward end, said gauge blocks being attached to the rearward end of the measuring rod, two feeler systems of identical construction for engaging the gauge blocks and the workpiece, respectively, said feeler system engaging the gauge blocks being mounted on said base, said feeler system engaging the workpiece being disposed on the forward end of the measuring rod, and a precision feeler gauge mounted on the base and adapted to indicate the deviation of the workpiece from the standard of comparison.

2. The device of claim 1 wherein said measuring rod is supported by air under pressure.

3. The device of claim 2, wherein a guide-way of V-shaped cross section is provided and the measuring rod is supported by the air under pressure in said guide-way.

4. The device of claim 2, wherein ports for the discharge of air under pressure are provided in the said measuring rod.

5. The device of claim 1, wherein the surface of the measuring rod receiving the gauge blocks is adjustable in relation to the axis of displacement of the measuring rod.

6. The device of claim 5, wherein the adjustment is provided by a pair of relatively rotatable slightly tapered plates.

7. The device of claim 1, wherein the feeler systems are of the pneumatically operating type.

8. The device of claim 7, wherein the feeler systems are provided with feeler arms and two measuring nozzles are provided for discharging the air under pressure to stabilize the feeler arms of the feeler systems in their respective zero positions as well as to produce the required measuring force.

9. The device of claim 1, wherein a friction drive mechanism is provided to displace the measuring rod.

10. The device of claim 9, wherein an arm is pivotally mounted in said base, and an endless belt is connected to said measuring rod and is movable in the direction of measuring and a friction wheel is carried by the arm and swingable in the direction of measuring and engages the endless belt and wherein an adjusting screw is rotatably carried by said base and a leaf spring extending between said arm and said base in the direction of measuring and subjected to a pulling force and engaged by said adjusting screw so as to pivot the arm in the direction of measuring.

No references cited.